(12) United States Patent
Thistle et al.

(10) Patent No.: US 10,677,073 B2
(45) Date of Patent: Jun. 9, 2020

(54) BLADE PLATFORM WITH DAMPER RESTRAINT

(71) Applicant: United Technologies Corporation, Farmington, CT (US)

(72) Inventors: Charles Thistle, Middletown, CT (US); Mohamed Hassan, Palm City, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 326 days.

(21) Appl. No.: 15/397,519

(22) Filed: Jan. 3, 2017

(65) Prior Publication Data

US 2018/0187559 A1    Jul. 5, 2018

(51) Int. Cl.
*F01D 5/26* (2006.01)
*F01D 11/00* (2006.01)
*F01D 5/22* (2006.01)

(52) U.S. Cl.
CPC ............... *F01D 5/26* (2013.01); *F01D 5/22* (2013.01); *F01D 11/006* (2013.01); *F05D 2220/32* (2013.01); *F05D 2260/96* (2013.01); *Y02T 50/671* (2013.01)

(58) Field of Classification Search
CPC ..... F01D 5/10; F01D 5/22; F01D 5/26; F01D 11/005; F01D 11/006; F01D 25/04; F01D 25/06; F04D 29/668
USPC ............................................ 416/193 A, 500
See application file for complete search history.

(56) References Cited

U.S. PATENT DOCUMENTS

| | | | |
|---|---|---|---|
| 3,709,631 A | | 1/1973 | Karstensen et al. |
| 3,752,598 A | * | 8/1973 | Bowers ............... F01D 5/3007 415/115 |
| 4,029,436 A | | 6/1977 | Shoup et al. |
| 4,183,720 A | | 1/1980 | Brantley |
| 4,580,946 A | * | 4/1986 | Bobo ................. F01D 11/006 416/190 |
| 5,143,517 A | * | 9/1992 | Vermont ............... F01D 5/22 416/190 |
| 5,156,528 A | * | 10/1992 | Bobo ..................... F01D 5/22 416/190 |
| 5,161,949 A | | 11/1992 | Brioude et al. |
| 5,226,784 A | | 7/1993 | Mueller et al. |
| 5,313,786 A | | 5/1994 | Chlus et al. |
| 5,415,526 A | | 5/1995 | Mercadante et al. |

(Continued)

FOREIGN PATENT DOCUMENTS

| | | |
|---|---|---|
| EP | 0851097 A2 | 7/1998 |
| EP | 1221539 A2 | 7/2002 |

(Continued)

OTHER PUBLICATIONS

English Machine Translation for JPH09303107.

(Continued)

*Primary Examiner* — Moshe Wilensky
*Assistant Examiner* — Topaz L. Elliott
(74) *Attorney, Agent, or Firm* — Cantor Colburn LLP (57) ABSTRACT

A blade for a gas turbine engine is disclosed herein. The blade having: a root; a platform located between the root and the blade, wherein the platform defines a cavity; a damper restraint located at a peripheral edge of the platform, wherein the damper restraint is a raised feature extending along at least a portion of the peripheral edge of the platform.

15 Claims, 5 Drawing Sheets

(56) References Cited

U.S. PATENT DOCUMENTS

| | | | |
|---|---|---|---|
| 5,478,207 A | 12/1995 | Stec | |
| 5,785,499 A | 7/1998 | Houston et al. | |
| 5,820,346 A | 10/1998 | Young | |
| 5,827,047 A | 10/1998 | Gonsor et al. | |
| 6,171,058 B1 | 1/2001 | Stec | |
| 6,450,769 B2 | 9/2002 | Szwedowicz | |
| 6,478,544 B2 | 11/2002 | Brandl et al. | |
| 6,851,932 B2 | 2/2005 | Lagrange et al. | |
| 7,021,898 B2 | 4/2006 | Elliott et al. | |
| 7,121,802 B2 * | 10/2006 | Athans | F01D 5/22 416/193 A |
| 7,762,773 B2 * | 7/2010 | Liang | F01D 5/22 415/115 |
| 8,167,563 B2 | 5/2012 | Kayser | |
| 8,240,987 B2 | 8/2012 | Spangler et al. | |
| 8,322,990 B2 * | 12/2012 | Hunt | F01D 5/10 415/119 |
| 8,353,672 B2 * | 1/2013 | Townes | F01D 5/10 416/190 |
| 8,820,754 B2 * | 9/2014 | Stewart | F01D 5/22 277/641 |
| 8,888,456 B2 | 11/2014 | Borufka et al. | |
| 8,961,137 B2 * | 2/2015 | Berche | F01D 5/082 416/190 |
| 2010/0054917 A1 | 3/2010 | Razzell | |
| 2010/0061854 A1 | 3/2010 | Townes et al. | |
| 2013/0195665 A1 | 8/2013 | Snyder et al. | |
| 2013/0276456 A1 | 10/2013 | Propheter-Hinckley et al. | |
| 2016/0061048 A1 | 3/2016 | Corcoran | |
| 2016/0251963 A1 | 9/2016 | Tardif et al. | |
| 2016/0273367 A1 | 9/2016 | Lana et al. | |
| 2018/0149025 A1 | 5/2018 | Thistle et al. | |
| 2018/0187558 A1 | 7/2018 | Thistle et al. | |
| 2018/0187562 A1 | 7/2018 | Thistle et al. | |

FOREIGN PATENT DOCUMENTS

| | | | |
|---|---|---|---|
| EP | 1600606 | 11/2005 | |
| EP | 1867836 A2 | 12/2007 | |
| EP | 2098687 A1 | 9/2009 | |
| FR | 2927357 A1 | 8/2009 | |
| JP | H09303107 A | 11/1997 | |
| JP | 2003020995 A * | 1/2003 | F01D 11/006 |
| JP | 2003056490 | 2/2003 | |
| JP | 2006125372 A * | 5/2006 | F01D 5/22 |
| JP | 2014185646 A * | 10/2014 | F01D 5/22 |
| WO | WO-03014529 A1 * | 2/2003 | F01D 5/22 |
| WO | 2007063128 A1 | 6/2007 | |
| WO | 2013154657 A2 | 10/2013 | |
| WO | 2014004001 A1 | 1/2014 | |
| WO | 2014160641 A1 | 10/2014 | |

OTHER PUBLICATIONS

English Machine Translation of EP2098687.
English Machine Translation of FR2927357.
European Search Report for Application No. EP 17 20 4019.
European Search Report for Application No. EP 18 15 0229.
European Search Report for Application No. EP 18 15 0231.
European Search Report for Application No. EP 18 15 0242.
English Machine Translation to Abstract JP2003056490.

* cited by examiner

BLADE PLATFORM WITH DAMPER RESTRAINT

BACKGROUND

Exemplary embodiments of the present disclosure are directed to turbine blades and/or compressor blades for a gas turbine engine and methods for restraining a damper of a turbine blade and/or compressor blade.

A gas turbine engine includes a plurality of turbine blades and compressor blades each received in a slot of a disk. The blades are exposed to aerodynamic forces that can result in vibratory stresses. A seal damper or damper can be located under platforms of adjacent blades to reduce the vibratory response and provide frictional damping between the blades. The seal damper slides on an underside of the platforms. The seal damper is made of a material that is dissimilar from the material of the blades. When the vibratory motions of adjacent blades oppose each other (that is, occur out of phase), the seal damper slides to absorb the energy of vibration.

Seal dampers work by conforming to the underside of blade platforms to seal the mate-face gap between blades and provide frictional damping to suppress the vibratory response of the blades to excitations in the engine. These dampers are typically made of sheet metal and have been shown to readily conform to the underside of the platform when subjected to centrifugal loads in a high temperature environment due to their lack of stiffness out-of-plane.

Sometimes seal dampers will experience unintentional bulk tangential movement relative to the damper pocket due to the dynamic forces imposed on it by the rotation of the blades and the lack of sufficient restraint devices. To maximize damper efficiency, damper configurations are sought which minimize weight and maximize damper stiffness. Thus it is desirable to limit the number of weight increasing restraint devices on the damper (i.e. features which interlock with "damper tabs", "damper nubs", or some other feature of the under-platform geometry, or "bathtub" type designs that pre-conform to under-platform filleting).

Accordingly, it is desirable to a method and apparatus for restraining movement of a damper with respect to a blade platform.

BRIEF DESCRIPTION

In one embodiment, a blade for a gas turbine engine is provided. The blade having: a root; a platform located between the root and the blade, wherein the platform defines a cavity; a damper restraint located at a peripheral edge of the platform, wherein the damper restraint is a raised feature extending along at least a portion of the peripheral edge of the platform.

In addition to one or more of the features described above, or as an alternative to any of the foregoing embodiments, the damper restraint may be a pair of raised features extending along at least a portion of opposing peripheral edges of the platform.

In addition to one or more of the features described above, or as an alternative to any of the foregoing embodiments, the damper restraint may be a plurality of raised features extending along at least a portion one of the peripheral edges of the platform.

In addition to one or more of the features described above, or as an alternative to any of the foregoing embodiments, the damper restraint may extend along a suction side of the platform.

In addition to one or more of the features described above, or as an alternative to any of the foregoing embodiments, the damper restraint may extend along a pressure side of the platform.

In addition to one or more of the features described above, or as an alternative to any of the foregoing embodiments, the blade may be a turbine blade.

In addition to one or more of the features described above, or as an alternative to any of the foregoing embodiments, the blade may be a compressor blade.

In yet another embodiment, a gas turbine engine is provided. The gas turbine engine having: a disk; a plurality of blades secured to the disk, each of the blades having a root, and a platform located between the root and the blade, wherein a seam is defined by adjoining platforms of each of the blades when they are secured to the disk, wherein the platform of each of the plurality of blades defines a cavity and has a damper restraint retaining movement of a damper seal received in the cavity, wherein the damper seal covers the seam and a top surface portion of the damper seal engages the damper restraint.

In addition to one or more of the features described above, or as an alternative to any of the foregoing embodiments, the damper restraint may be a pair of raised features extending along at least a portion of opposing peripheral edges of the platform.

In addition to one or more of the features described above, or as an alternative to any of the foregoing embodiments, the damper restraint may be a plurality of raised features extending along at least a portion one of the peripheral edges of the platform.

In addition to one or more of the features described above, or as an alternative to any of the foregoing embodiments, the damper restraint may extend along a suction side of the platform.

In addition to one or more of the features described above, or as an alternative to any of the foregoing embodiments, the damper restraint may extend along a pressure side of the platform.

In addition to one or more of the features described above, or as an alternative to any of the foregoing embodiments, the blade may be a turbine blade.

In addition to one or more of the features described above, or as an alternative to any of the foregoing embodiments, the blade may be a compressor blade.

In addition to one or more of the features described above, or as an alternative to any of the foregoing embodiments, the damper seal may be formed from stamped sheet metal and a top surface portion of the damper seal contacts the damper restraint.

In addition to one or more of the features described above, or as an alternative to any of the foregoing embodiments, the damper restraint may be a pair of raised features extending along at least a portion of opposing peripheral edges of the platform.

In addition to one or more of the features described above, or as an alternative to any of the foregoing embodiments, the damper restraint may be a plurality of raised features extending along at least a portion one of the peripheral edges of the platform.

In addition to one or more of the features described above, or as an alternative to any of the foregoing embodiments, the damper restraint may extend along a suction side of the platform or a pressure side of the platform.

In yet another embodiment, a method of damping vibrations between adjoining blades of a gas turbine engine is provided. The method including the steps of: locating a damper seal adjacent to a seam defined by adjoining platforms of blades of the gas turbine engine; and restraining the movement of the damper seal in a direction away from the seam by retaining the damper seal with at least one protrusion extending along a peripheral edge of at least one of the adjoining platforms.

In addition to one or more of the features described above, or as an alternative to any of the foregoing embodiments, the damper seal may be formed from stamped sheet metal and the blade may be either a compressor blade or a turbine blade and the at least one protrusion engaging a top surface of the damper seal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
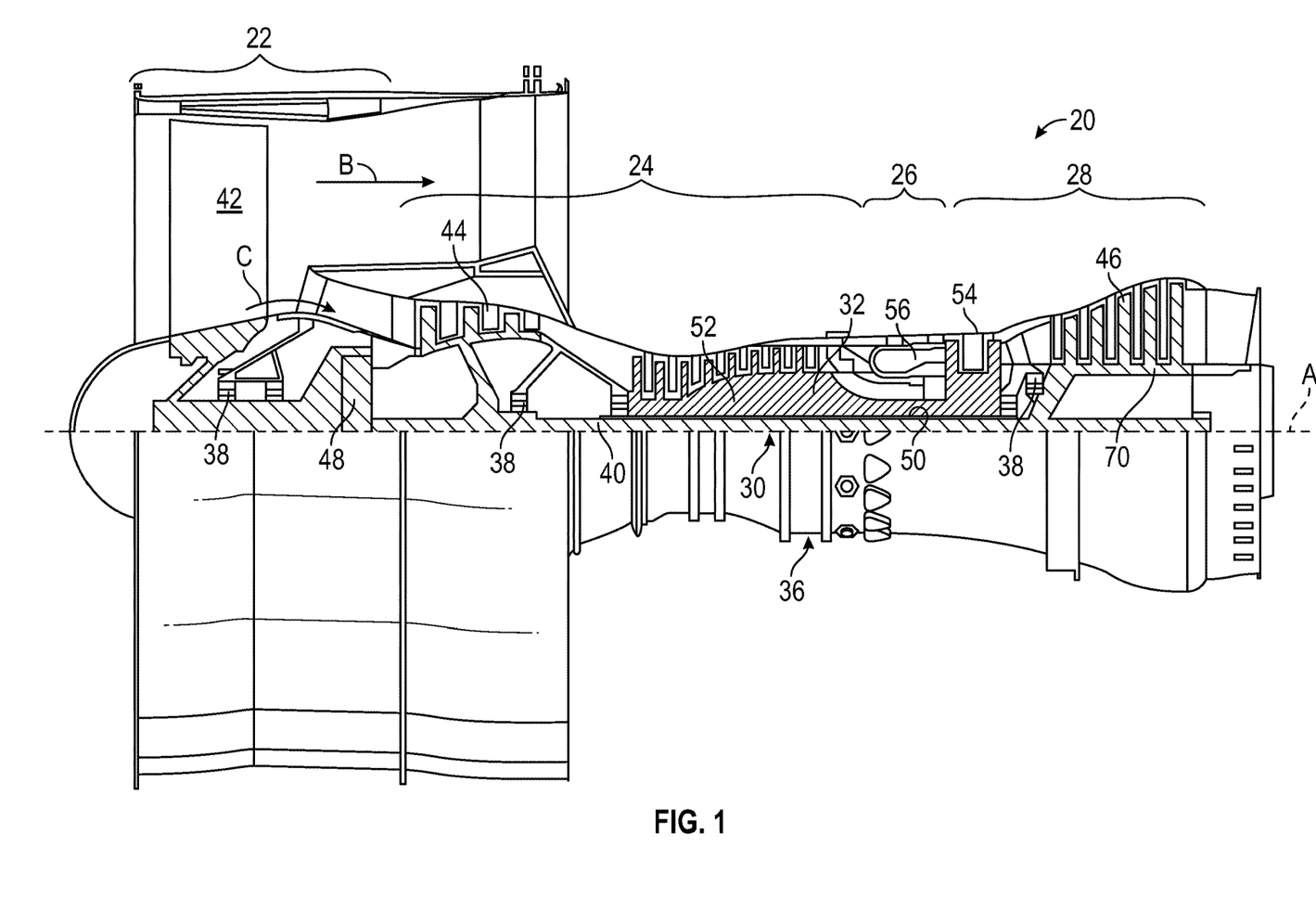
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram°R)/(518.7°R)]^{0.5}$. The "Low corrected fan tip speed" as disclosed herein according to one non-limiting embodiment is less than about 1150 ft/second (350.5 m/sec).

The turbine section 28 includes turbine discs 70 that each rotate about the axis A. As is known in the related arts, the turbine section may include a plurality of stages each having a plurality of turbine blades mounted to respective turbine disk of each stage.

Figure 2:
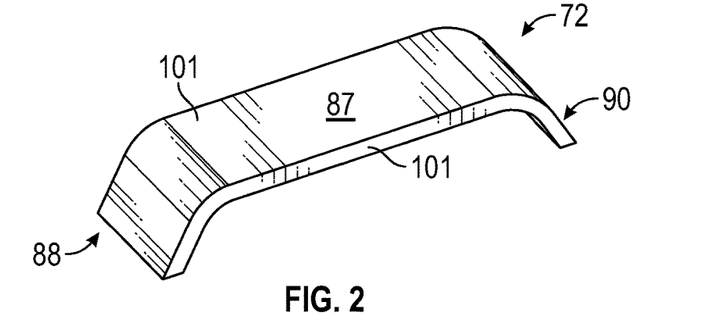
FIG. 2 is a non-limiting perspective view of a damper or damper seal.
Figure 3:
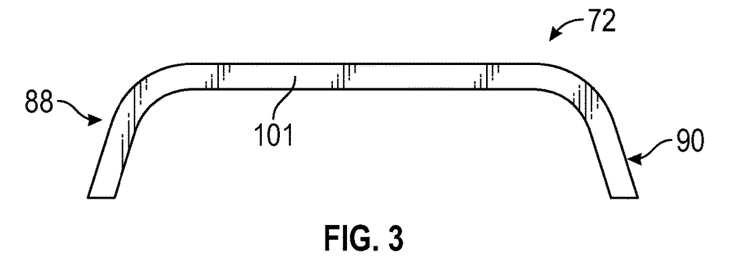
FIG. 3 is a side view of the damper seal illustrated in FIG. 2.

FIG. 2 illustrates a non-limiting perspective view of a damper seal or damper 72 for installation under platforms of adjacent turbine blades to reduce the vibratory response and provide frictional damping between the turbine blades as well as sealing the mate-face gap between blades. These dampers may be made of sheet metal and conform to the underside of the platform when subjected to centrifugal loads in a high temperature environment due to their lack of stiffness out-of-plane. Although the present disclosure is described with reference to turbine blades it is understood that anyone of the various embodiments disclosed herein may be applied to platforms of adjacent compressor blades of a compressor disc or rotor to reduce the vibratory response and provide frictional damping between the compressor blades as well as sealing the mate-face gap between blades. Therefore and when referring to FIGS. 4-9 these may alternatively be referred to as compressor blades. Moreover, various embodiments of the present disclosure may be applied in any other application where there is a desire to reduce the vibratory response and provide frictional damping between two adjoining items that are rotated about an axis as sealing the mate-face gap between the two adjoining items. FIG. 3 is a side view of the damper seal or damper 72 illustrated in FIG. 2.

The damper seal or damper 72 may also be formed by direct metal laser sintering. Other manufacturing methods are possible. The damper seal 72 may be ductile enough to conform to a lower surface of the platform of the turbine blade. In one example, the damper seal 72 is substantially c-shaped.

Figure 4:
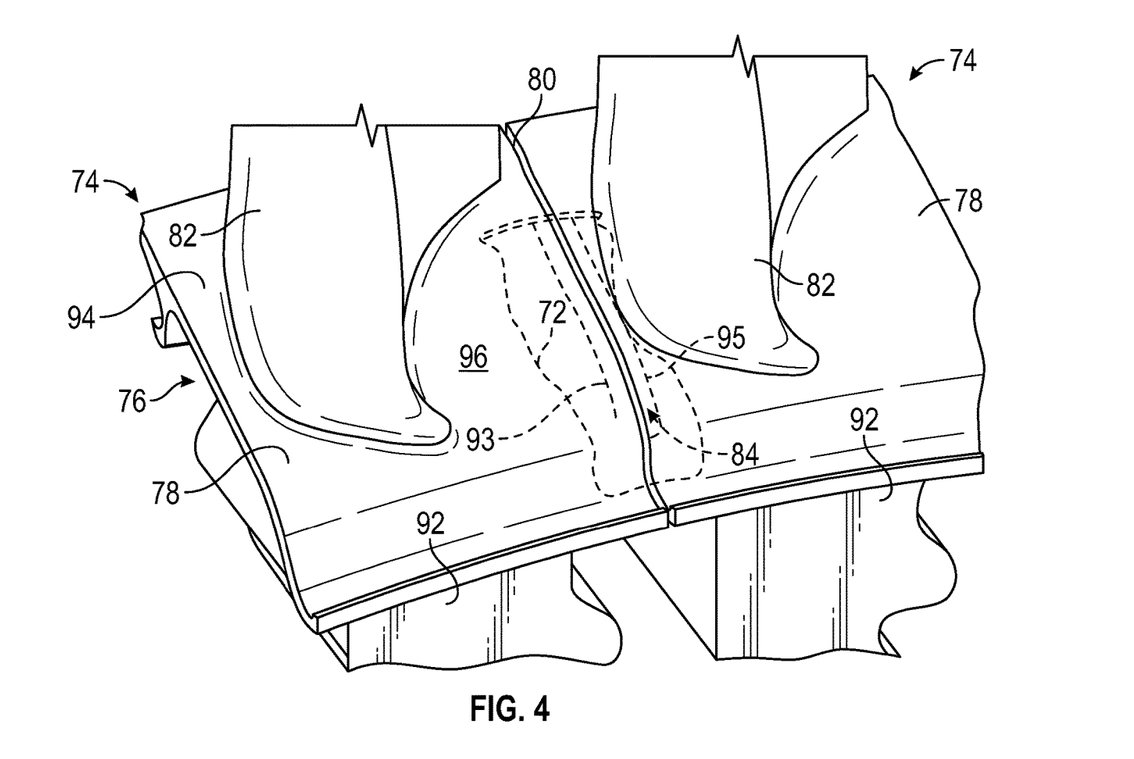
FIG. 4 is a perspective view of a damper seal installed between two adjacent turbine blades.
Figure 5:
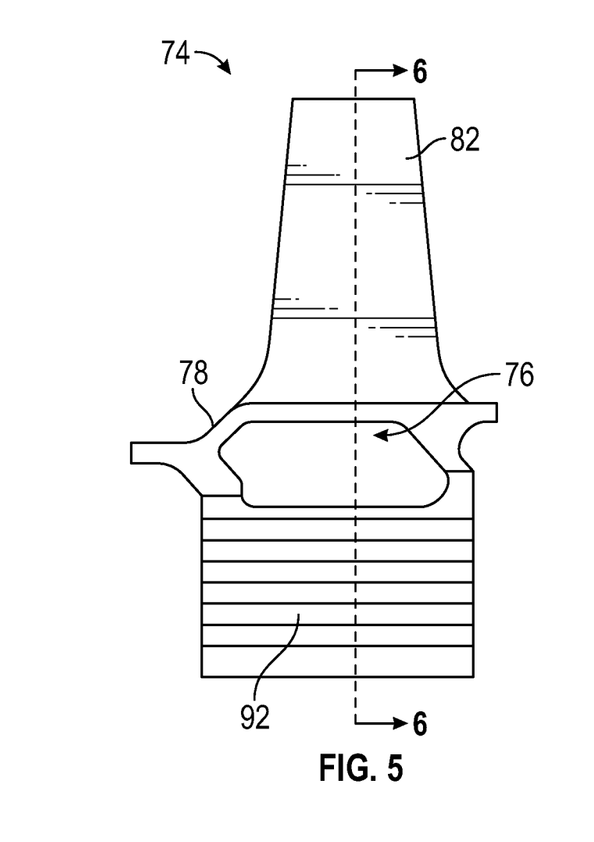
FIG. 5 is a side view of a turbine blade with an under platform damper restraint.
Figure 6:
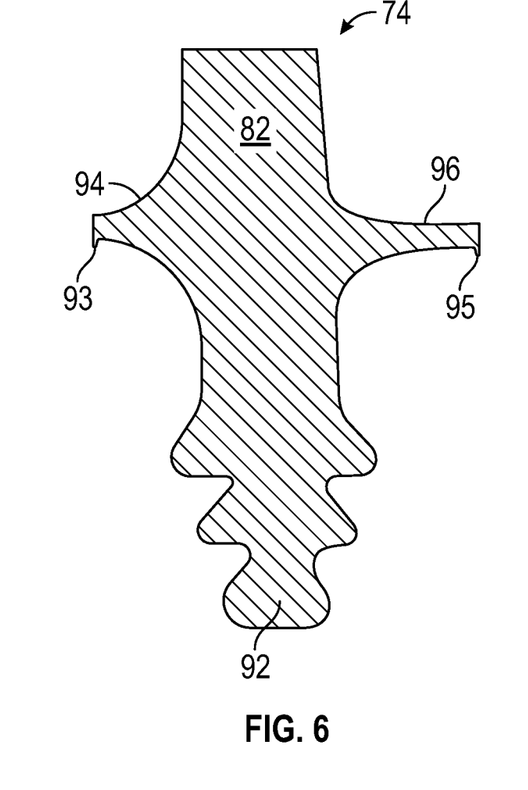
FIG. 6 is a view along lines 6-6 of FIG. 5.
Figure 7:
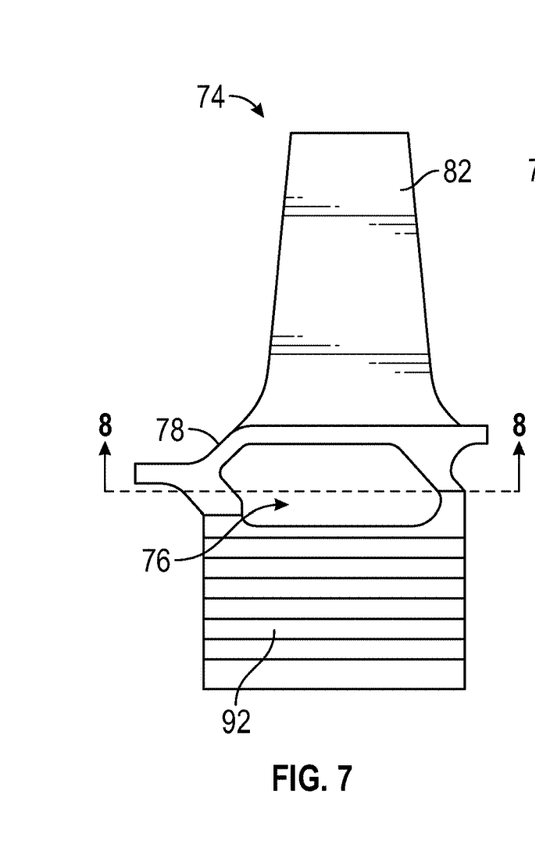
FIG. 7 is a side view of a turbine blade with an under platform damper restraint.

Referring now to FIG. 4, a top perspective view of the damper seal 72 installed in adjacent turbine blades 74 is provided. The damper seal 72 is located in a neck cavity 76 of the turbine blades 74. As illustrated in at least FIGS. 5-9, the neck cavity 76 is defined as being located below the platform 78 of the turbine blade 74 and above the turbine disk the blades 74 are secured to.

As illustrated, the damper seal 72 spans a space 80 between adjacent platforms 78 of adjacent turbine blades 74 to provide both damping and sealing and prevent the leakage of the cooling air from the cavity 76. The damper seal 72 imposes a normal load on the adjacent turbine blades 74 due to centrifugal force. The resulting frictional force created by the normal load produces damping to reduce a vibratory response. The damper seal 72 prevents the cooling air in the neck cavity 76 from leaking into the hot flow gas path between airfoils 82 of the turbine blades 74.

In accordance with an embodiment of the present disclosure, a damper restraint 84 for retaining a damper seal 72 received in the cavity 76 is provided. In one embodiment, the damper restraint 84 is a raised portion of material, rib, bump or feature located at a lateral or peripheral edge 86 of the platform 78.

The damper restraint 84 is configured to engage a top portion or top surface portion 87 of the damper seal 72 that extends between a first end portion 88 and an opposing second end portion 90 of the damper seal 72. As illustrated, the first end portion 88 and the second end portion 90 extend towards a root 92 of the turbine blade 74 when the damper seal 72 is located in the cavity 76.

Figure 9:
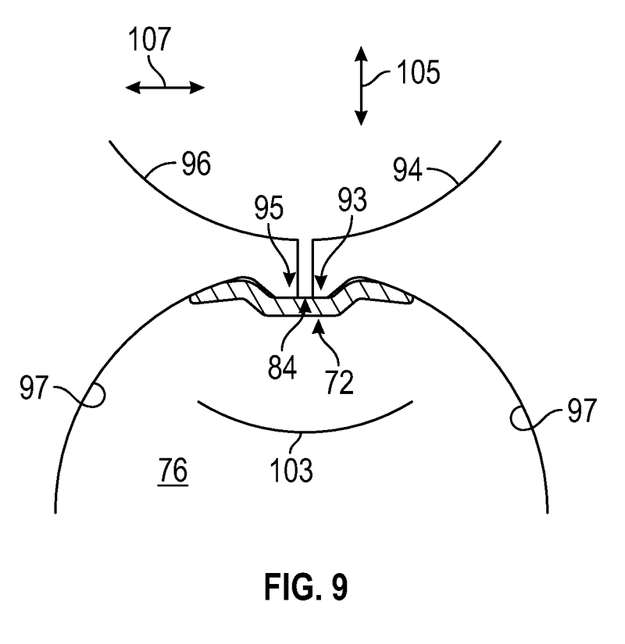
FIG. 9 is a cross sectional view illustrating an under platform damper restraint and a damper according to one embodiment.

In one embodiment and as illustrated in the attached FIGS., the damper restraint 84 may be the combination of a raised feature, or rail or "bump" 93 located at the peripheral edge 86 under a suction side 94 of the platform 78 that runs along the peripheral or lateral edge 86 of the platform 78 of one blade or a first blade 74 and a raised feature, or rail or "bump" 95 located at the peripheral edge 86 under a pressure side 96 of the platform 78 of another blade or second blade 74 that is adjacent to the first blade 74. As such, the pair of side by side raised features, rails or "bumps" 93, 95 provide the damper restraint 84 when they are side by side, which corresponds to the blades 74 being secured to the disc 70. One non-limiting configuration is illustrated in FIG. 9.

Figure 8A:
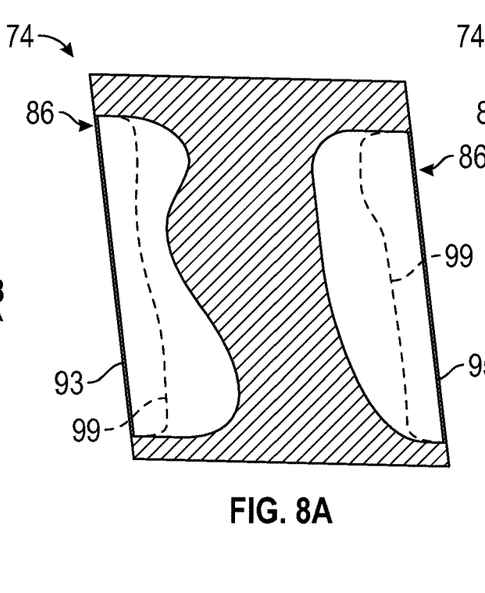
FIG. 8A is a view along lines 8-8 of FIG. 7 according to one embodiment.

In one embodiment and as illustrated in FIG. 8A, the raised feature(s), or rail(s) or "bump(s)" 93, 95, may run along the entire length of edge 86. Alternatively, the raised feature(s), or rail(s) or "bump(s)" 93, 95, may run along a majority (e.g. greater than 50%) of the entire length of edge 86. Of course, other variations less than 50% are also considered to be within the scope of various embodiments of the present disclosure. In yet another embodiment and referring now to FIG. 8B the raised feature(s), or rail(s) or "bump(s)" 93, 95, may run intermittingly and comprise an interrupted pattern or plurality of raised feature(s), or rail(s) or "bump(s)" 93, 95 that run along the entire length of edge 86 or any portion thereof (e.g., greater or less than 50%).

In yet another embodiment the raised feature(s), or rail(s) or "bump(s)" 93, 95 may be located on only one side of the platform 78 (e.g., either the suctions side 94 or the pressure side 96.

By locating the damper restraint 84 on an interior surface 97 of the platform 78, a device is created that restrains the damper 72 from sliding toward the suction side of the pocket 76 when it is subject to tangential dynamic forces or rotational forces (e.g. induced by the orientation of the pocket (or broach angle) relative to the axis of rotation). Thus, undesired tangential movement of the damper 72 is prevented.

Figure 8B:
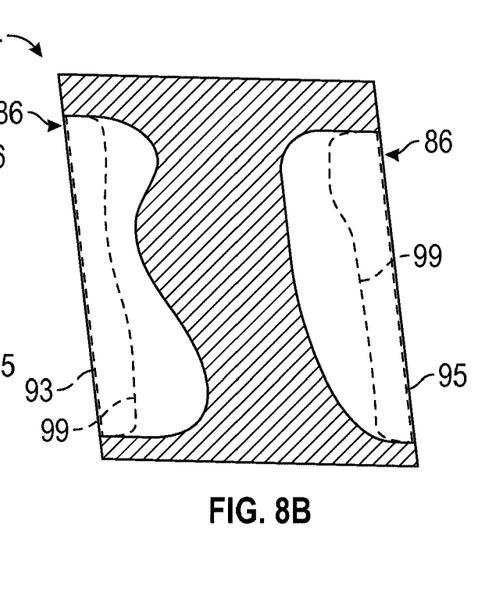
FIG. 8B is a view along lines 8-8 of FIG. 7 according to another embodiment.

The dashed lines 99 in FIGS. 8A and 8B illustrate the nominal position of the edges 101 (illustrated in FIG. 4) of the damper or damper seal 72.

This design feature (e.g., damper restraint 84) allows the potential elimination of weight increasing damper restraint devices as it only requires features at the peripheral edges of the platform. It can make new and current damper designs more effective without modifying the damper itself, and with only a minimal change to the blade platform that can be readily cast in. The feature can also be formed through some additive technique such as welding so that is can be used as a potential aftermarket fix to reduce the amount of damper deformation seen in service.

Furthermore and in one embodiment, one or more rails, or regions of generally raised material, running along the damper edge are formed on the underside of the blade suction side or pressure side platform by casting, machining, or some additive method. The restraint can run the entire length of the damper, or it can run for only a portion of it. The cross section of the rail may have a smooth or circular profile, or it can be square, triangular, or some other faceted shape.

By bending the top portion 87 about the protrusion formed by the bumps or features 93, 95, a radial component is added to the contact surface 87 of the damper seal 72. In other words, the concave surface formed in the top portion 87, which is caused by the heat and centripetal forces applied thereto, is adjacent to the surfaces of the damper restraint 84 formed by bumps or features 93, 95. This radial component is illustrated by curved line 103. This radial component improves dampening in the radial direction between the adjacent platforms 78 illustrated by arrows 105.

In addition, the chamfers or bevels also restrain movement of the damper seal 72 in the directions of arrows 107. Accordingly, the platforms 78 with rails, bumps or features 93, 95 provide damping in a radial direction as well as preventing movement of the damper seal in a tangential direction(s) 107.

In one embodiment, the rails, bumps or features 93, 95 on the platform edge may be formed into existing or new designs. In other words, the rails, bumps or features 93, 95 may be formed on the platform 78 through some additive technique such as welding, and can be used as a potential aftermarket fix to reduce the amount of damper deformation seen in service. Or for new designs, the rails, bumps or features 93, 95 may be included into a cast used to form new platforms 78. Moreover and by using rails, bumps or features 93, 95 at peripheral edges 86 of the platform 78, there is no need for a special damper seal design. In this way, the use of rails, bumps or features 93, 95 at peripheral edges 86 of the platform 78 can be particularly useful in the aftermarket as a way of correcting unintended damper operation. For example an existing platform 78 can be worked on through any suitable process to add rails, bumps or features 93, 95 at peripheral edges 86 of the platform 78.

In accordance with one non-limiting embodiment, the rails, bumps or features 93, 95 at peripheral edges 86 of the platform 78 extend over a portion or the entire length of both the pressure side and suction side of the platform edges or alternatively only along one of the pressure side and suction side of the platform edges. The seal damper or damper seal 72 plastically deforms under centrifugal loading and high temperature. Alternatively, the damper seal 72 may be preformed with a concave top surface 87. The rails, bumps or features 93, 95 provide a contact surface between the underside of the platforms and the top surface 87 of the seal damper or damper seal 72 such that a system is provided for suppressing both radial and tangential vibration.

Various embodiments of the present disclosure provide improved damper performance for blades that exhibit radial vibration. In addition, existing designs can be easily modified to incorporate the design. As such, a potential aftermarket fix to correct excessive damper deformation is provided. Still further, the overall weight of the platform 78 may be reduced by limiting the amount of material necessary for the rails, bumps or features 93, 95. Moreover and by locating the rails, bumps or features 93, 95 on an interior surface of the platform 78, a device is created that restrains the damper seal 72 from sliding toward the suction side of the pocket 76 or the pressure side of the pocket 76 when it is subject to tangential dynamic forces or rotational forces (e.g. induced by the orientation of the pocket (or broach angle) relative to the axis of rotation).

By creating a ridge of raised material, or a "rail", on the edge of the underside of either or both platforms, a device is created that will restrain the damper from sliding toward the suction side of the pocket. The damper will conform over and around the rail preventing its bulk motion. The damper doesn't need to be pre-conformed, but it can be. This design feature allows the potential elimination of weight increasing damper restraint devices. It can make new and current damper designs more effective without modifying the damper itself, and with only a minimal change to the blade platform that can be readily cast in. Additionally, the raised material can be designed in a way so that the system is effective in damping radial vibration (e.g. if the rail and the conformed damper share a contact surface with a component in the radial direction).

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade for a gas turbine engine, comprising:
   a root;
   a platform located between the root and an airfoil of the blade, wherein the platform defines a cavity;
   a damper seal located in the cavity;
   a damper restraint located at a peripheral edge of the platform, wherein the damper restraint comprises at least one raised feature extending along at least a portion of the peripheral edge of the platform, and the at least one raised feature has an uninterrupted profile that extends along an entire length of a top surface portion of the damper seal, the top surface portion extending past opposite sides of the at least one raised feature.

2. The blade as in claim 1, wherein the at least one raised feature is a pair of raised features extending along at least a portion of opposing peripheral edges of the platform.

3. The blade as in claim 1, wherein the damper restraint extends along a suction side of the platform.

4. The blade as in claim 1, wherein the damper restraint extends along a pressure side of the platform.

5. The blade as in claim 1, wherein the blade is a turbine blade.

6. The blade as in claim 1, wherein the blade is a compressor blade.

7. A gas turbine engine, comprising:
a disk;
a plurality of blades secured to the disk, each of the plurality of blades having a root, and a platform located between the root and an airfoil of the blade, wherein a seam is defined by adjoining platforms of each of the plurality of blades when they are secured to the disk, the platform of each of the plurality of blades defining a cavity and having a damper restraint retaining movement of a damper seal received in the cavity, the damper seal covering the seam and a top surface portion of the damper seal engages the damper restraint, wherein the top surface portion of the damper seal extends past opposite sides of the damper restraint and the damper restraint is located at a peripheral edge of the platform of each of the plurality of blades, wherein the damper restraint comprises at least one raised feature extending along at least a portion of the peripheral edge of the platform, and the at least one raised feature has an uninterrupted profile that extends along an entire length of the top surface portion of the damper seal.

8. The gas turbine engine as in claim 7, wherein the damper restraint of each of the plurality of blades extends along a suction side of the platform of each of the plurality of blades.

9. The gas turbine engine as in claim 7, wherein the damper restraint of each of the plurality of blades extends along a pressure side of the platform of each of the plurality of blades.

10. The gas turbine engine as in claim 7, wherein each of the plurality of blades are a turbine blade.

11. The gas turbine engine as in claim 7, wherein each of the plurality of blades are a compressor blade.

12. The gas turbine engine as in claim 7, wherein the damper seal of each of the plurality of blades is formed from stamped sheet metal and a top surface portion of the damper seal contacts the damper restraint of each of the plurality of blades.

13. The gas turbine engine as in claim 7, wherein the damper restraint extends along a suction side of the platform and a pressure side of the platform.

14. A method of damping vibrations between adjoining blades of a gas turbine engine, comprising:
sealing a seam defined by adjoining platforms of the adjoining blades of the gas turbine engine by locating a damper seal over the seam wherein portions of a top surface portion of the damper seal extend past the seam and along underside surfaces of the adjoining platforms when the damper seal is located over the seam; and
restraining movement of the damper seal in a direction away from the seam by retaining the damper seal with at least one protrusion extending along a peripheral edge of at least one of the adjoining platforms, wherein the at least one protrusion has an uninterrupted profile and extends along an entire length of the top surface portion of the damper seal.

15. The method as in claim 14, wherein the damper seal is formed from stamped sheet metal and the adjoining blades are either compressor blades or turbine blades.

\* \* \* \* \*